Figure 1:
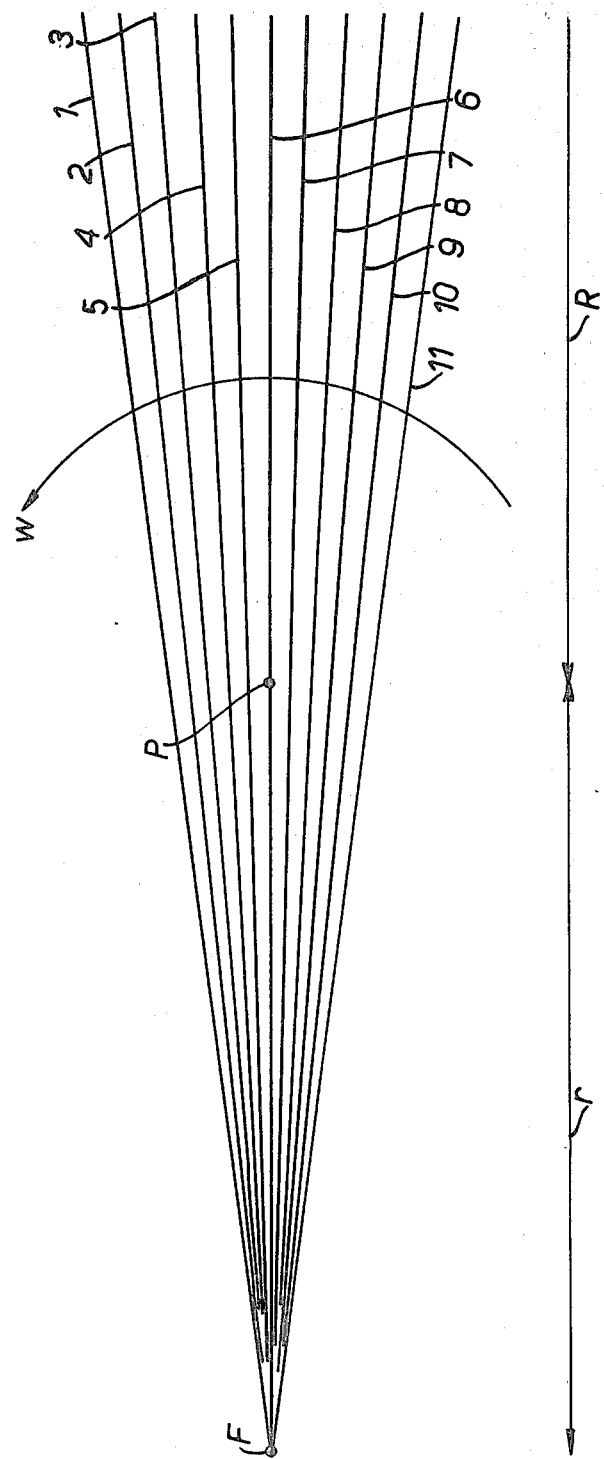

United States Patent [19]

Hair et al.

[11] 4,381,149

[45] Apr. 26, 1983

[54] RANGE RESPONSIVE APPARATUS

[75] Inventors: Thomas Hair, Chelmsford; Ivor R. Baxter, Brentwood, both of England

[73] Assignee: The Marconi Co. Ltd., Chelmsford, England

[21] Appl. No.: 548,727

[22] Filed: Feb. 13, 1975

[30] Foreign Application Priority Data

Feb. 19, 1974 [GB] United Kingdom ............... 7557/74

[51] Int. Cl.³ ............................................. G01C 3/08
[52] U.S. Cl. ...................................... 356/4; 250/338; 350/292; 350/299
[58] Field of Search .............................. 356/4, 5, 28; 250/237.6, 338; 350/292, 299

[56] References Cited

U.S. PATENT DOCUMENTS

| | | | |
|---|---|---|---|
| 2,878,711 | 3/1959 | Blackstone | 356/28 |
| 3,059,521 | 10/1962 | Clemens et al. | 356/4 |
| 3,856,401 | 12/1974 | Heitmann et al. | 356/28 |
| 3,888,589 | 6/1975 | Swift | 356/28 |

*Primary Examiner*—S. C. Buczinski
*Attorney, Agent, or Firm*—Diller, Ramik & Wight

[57] ABSTRACT

The invention provides a range responsive apparatus primarily intended for operation at infra-red. A detector is arranged to receive electro-magnetic energy simultaneously from different spaced portions of a field of view which is caused to rotate so as to sweep across a target. The electrical output of the detector includes a frequency component which is dependent upon the range of the target. Two detectors are normally provided each receiving energy from alternate portions of the field of view, the outputs of the two detectors being combined in anti-phase. Use may be made of frequency filters to create one or more range windows and frequency responsive means provided either simply to give an indication of target presence within a range window or the actual range of the target.

22 Claims, 10 Drawing Figures

RELATIONSHIP BETWEEN THE FACTORS $\frac{R+r}{r}$ AND R

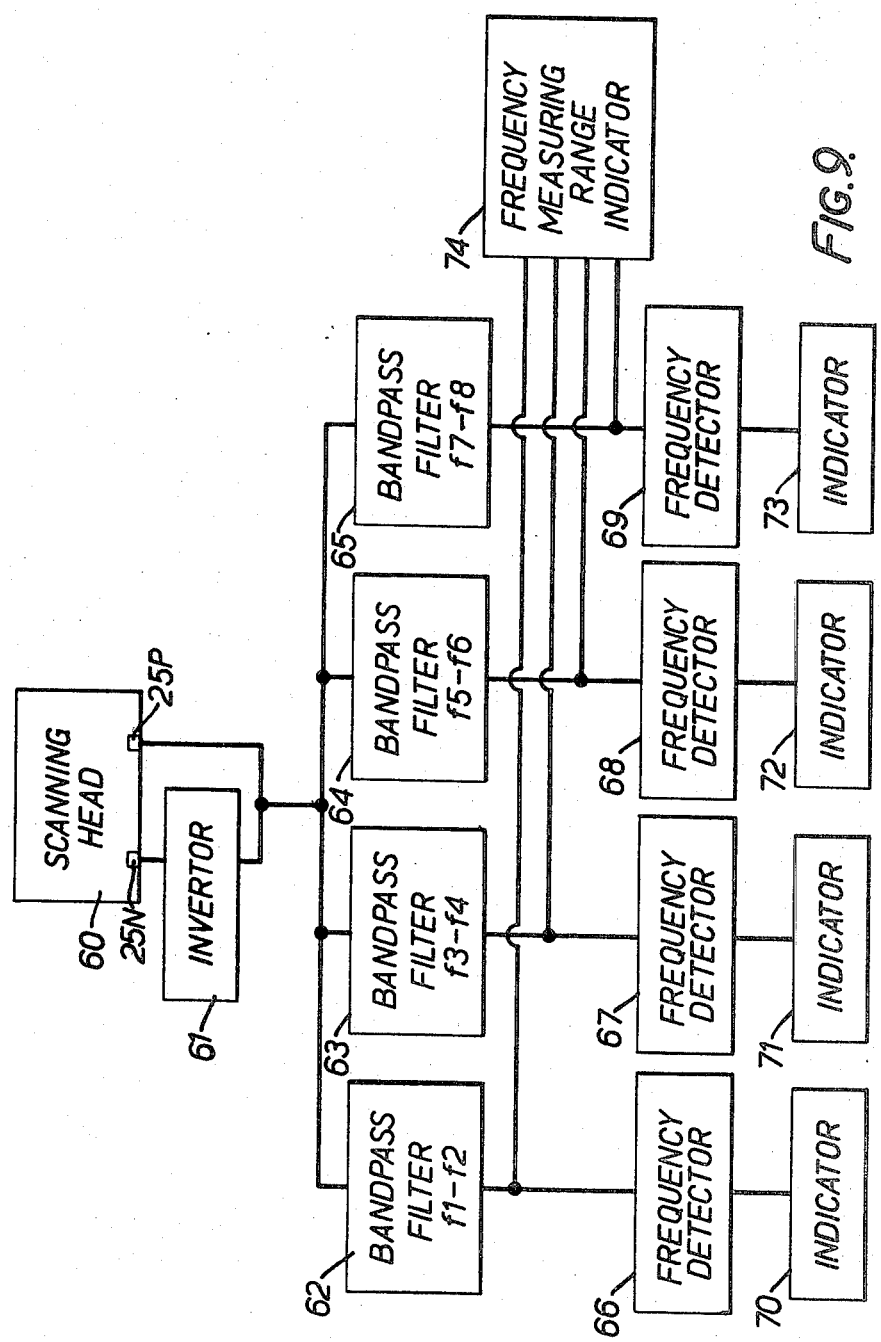

RANGE RESPONSIVE APPARATUS

This invention relates to range responsive apparatus and in particular to range finding apparatus.

As is well known the range of a target from a given point may be found using radar techniques. Even for "line of sight" range finding, however, radar equipment tends to be complicated and relatively bulky and require considerable amounts of power to operate.

For line of sight ranging optical systems may be used in which two images of a target are observed each through a different prism, the degree by which the prisms must be relatively moved in order to cause the images to overlap providing an indication of the range of the object of interest. Such apparatus, whilst simple and relatively small, tend to rely upon the skill of an operator and hence be prone to operator error. Furthermore their use requires that the target be visible to the eye.

The present invention seeks to provide an improved range responsive apparatus and in particular an improved range finding apparatus which does not suffer to the same extent to the defects mentioned above.

According to this invention a range responsive apparatus comprises an energy sensitive means arranged to receive electro-magnetic energy simultaneously from different spaced portions of a field of view and means for causing said field of view to sweep across a target whose range is to be determined whereby, in operation, the electrical output of said energy sensitive means includes a frequency component which is dependent upon the range of said target.

The energy sensitive means may comprise a plurality of individual energy sensitive devices each of which is arranged to receive energy from a different one of said spaced portions of said field of view and the outputs of which are arranged to be combined, but preferably said energy sensitive means comprises one energy sensitive detector arranged to receive energy from all of said spaced portions of said field of view.

Since in the output of said energy sensitive means a frequency component will appear which depends upon the range of a target the apparatus may be used to form a range measuring apparatus in which case frequency responsive means are provided for indicating the range of a target. Since targets at different ranges will result in the generation of different frequency components at the output of said energy sensitive means, one or more frequency band selective filters may be connected to the output of said energy sensitive means to provide one or more range windows so that selected ranges are excluded. This feature may be utilised to exclude unwanted responses from objects which come within the field of view but which are not of interest. The output of any filter may be applied to frequency responsive means for indicating the range of a target within the corresponding range window or windows. In addition or alternatively the output of any filter may be applied to a frequency responsive means which generates a signal indicating the presence of a target at a range of interest within the range window or windows.

Preferably said means for causing said field of view to sweep across a target comprises means for causing said field of view to rotate.

Normally said energy sensitive means is infra-red energy sensitive means.

Normally again the lines bounding the different portions of the field of view are arranged to be divergent in the target direction so that a focal point exists for the lines. In this case, where means are provided for rotating the field of view, preferably the axis of rotation is situated on the target side of said focal point.

A series of individual reflective elements, one for each portion of the field of view, may be interposed between said focal point and the axis of rotation, each elemental reflective element being arranged to direct electro-magnetic energy via a different slit in a grating on to a common detector. In effect, in this case the portions of the field of view are provided by the grating imaged in space by said elemental reflective elements.

Normally the slits are narrow in the plane of rotation and relatively long in a plane at right angles thereto in order to provide good energy gathering properties.

In one embodiment of the invention said elemental reflective elements are so inclined that the images of the slits in the grating are closed-up in the field of view so that the field of view is divided into a series of adjacent parts each an image of a different slit and means are provided for optically dividing each slit, and hence each of said adjacent parts of the field of view, into two portions along its extension in a direction at right angles to the plane of rotation, energy received by one portion of each slit being directed on to one detector, whilst energy received on the other portion of each slit is directed on to another detector, the outputs of which are arranged to be combined in anti-phase prior to being applied for connection to frequency measuring means.

The embodiment described above operates very satisfactorily, particularly at longer ranges. However, because each reflective element handles two portions of the field of view a certain amount of confusion may be experienced at short ranges between the two portions of the field of view handled by each reflective element, due to the common imaging area and according to a modification a series of individual reflective elements are provided, one for each portion of the field of view, the individual reflective element for one portion of the field of view being arranged to direct light into one portion of one slit in the grating, whilst an adjacent individual reflective element is arranged to direct light received from the adjacent portion of the field of view through the other portion of the same slit. In other words, for each adjacent part of the field of view formed by an image of a slit, two individual reflective elements are provided each associated with a different portion of the same slit.

In another embodiment of the invention an array of focusing electro-magnetic energy reflective elements are provided each arranged to image an electro-magnetic energy detector into space, each focusing reflective element viewing a different spaced portion of the field of view. Preferably, a second electro-magnetic energy detector is provided which is arranged to be imaged into space by a second array of focusing electro-magnetic energy reflective elements, the focusing reflective elements of said second array being interspersed in alternating fashion between the focusing reflective elements of said first array and arranged to view different spaced portions of the field of view which are interspersed in alternating fashion with the portions of the field of view viewed by the focusing reflective elements of said first array. Normally the portions of the field of view viewed by all of the reflective elements in both arrays are of equal length in the plane of rotation and normally again means are provided for combining the outputs of said two detectors in anti-phase prior to being applied for connection to frequency responsive means.

Preferably each focusing reflective element is a spherical reflective element.

Preferably said focusing elemental reflective elements are arranged to direct light received from the portions of the field of view on to the, or the respective, electro-magnetic energy detector via an array of plane reflectors said focusing reflective elements being arranged to lie in a plane spaced from the plane in which the array of planar reflective elements lie, but with said two last mentioned planes parallel to the plane of rotation, and said focusing and planar reflective elements being tilted from the peripendicular to the plane of rotation as required to provide the energy paths from the focusing reflective elements to the detector or detectors, as required.

Preferably again a second array of planar reflective elements is interposed between said first mentioned array of planar reflective elements and the detector or detectors, said second array of planar reflective elements lying in a plane spaced from but parallel to the said plane in which the first mentioned array of planar reflective elements lie and on the side thereof remote from the said plane in which the focusing reflective elements lie, the planar reflective elements of said second array being also tilted from the perpendicular to the plane of rotation as required. The detector or detectors may lie in the same plane as the second array of planar reflective elements or in a further plane spaced from but parallel to the plane in which said second array of planar reflective elements lie and on the side thereof remote from the plane in which the first array of planar reflective elements lie.

In a practical embodiment in which the plane of rotation is the horizontal plane, said array of focusing reflective elements is arranged at one level across the rear of a housing to direct received energy in the target direction towards the front of said housing onto said first array of planar reflective elements which are arranged at a lower level towards the front of said housing, said first array of planar reflective elements is arranged to direct energy towards the rear of said housing onto said second array of planar reflective elements which is arranged at a still lower level and said second array of planar reflective elements is arranged to direct energy towards said detector or detectors mounted towards the front of the housing at a level below that of said second array of planar reflective elements.

Preferably the axis of rotation is arranged to pass approximately through the middle of said array of focusing reflective elements.

Figure 2:
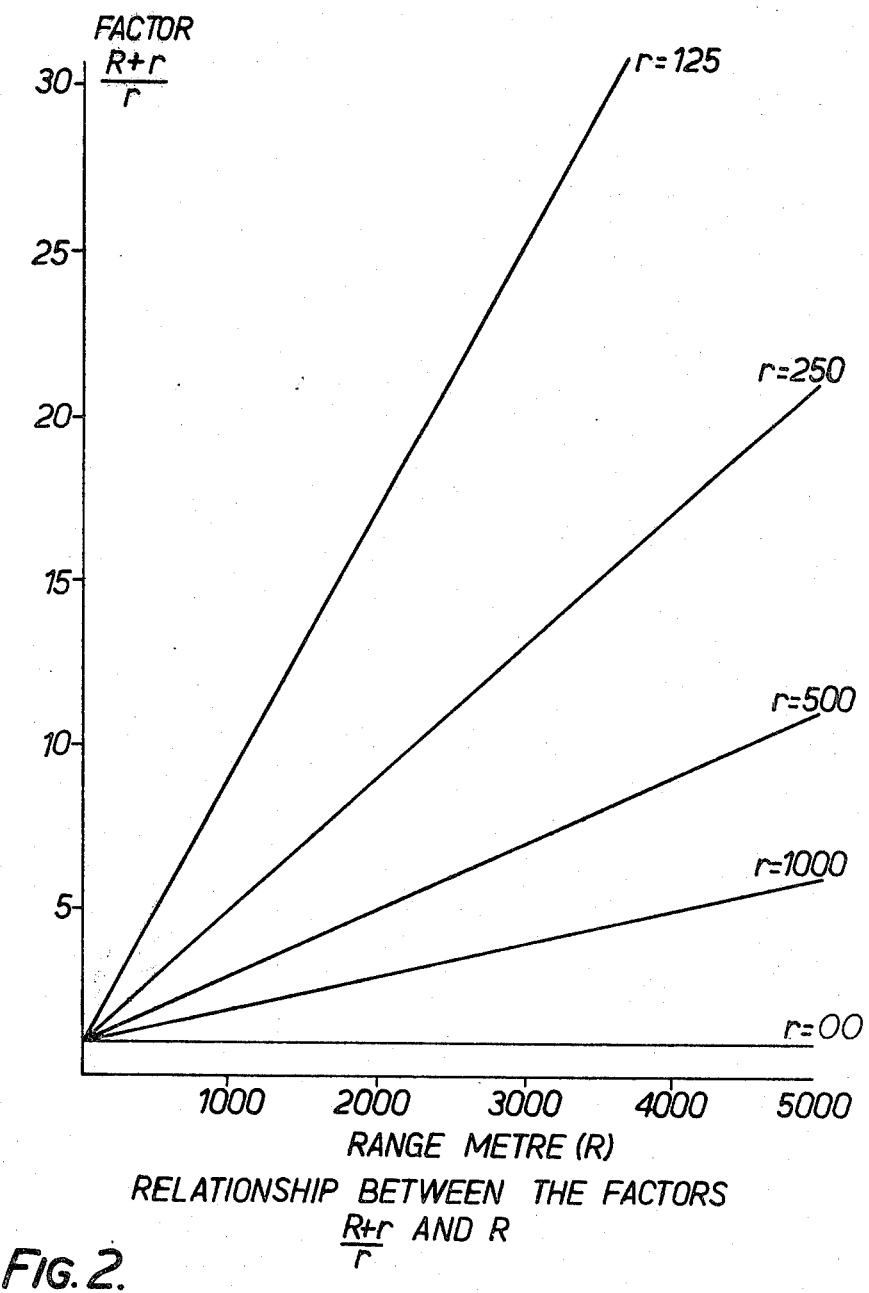
Figure 3:
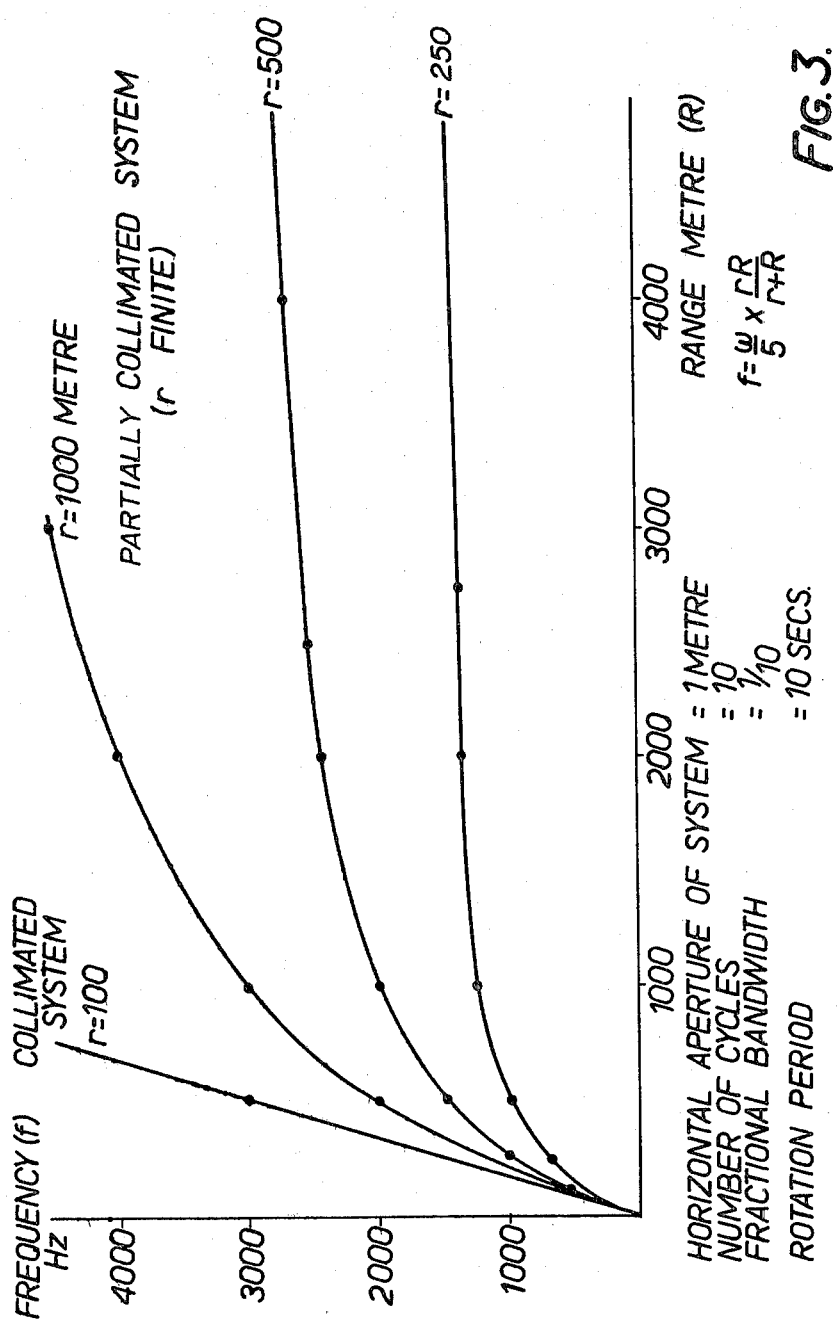
Figure 4:
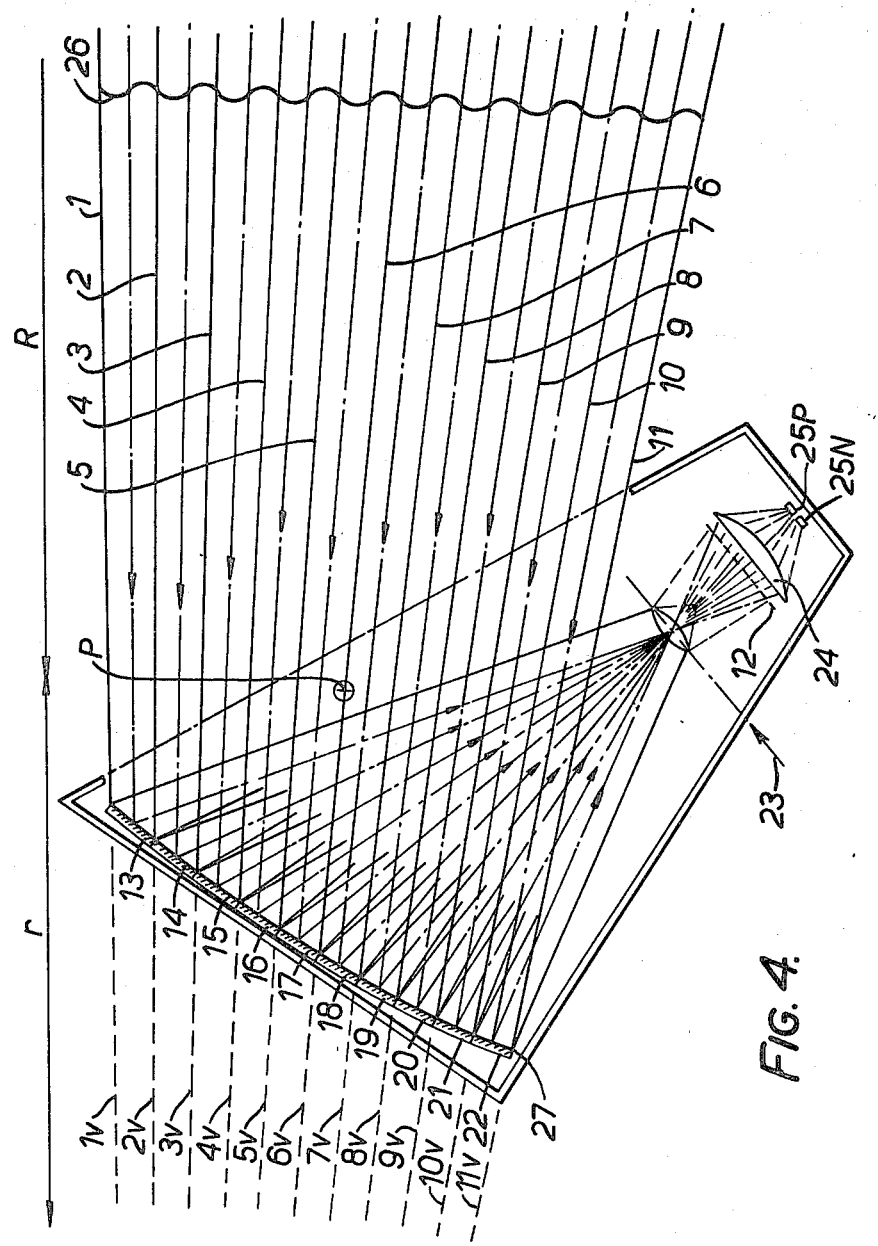
Figure 5:
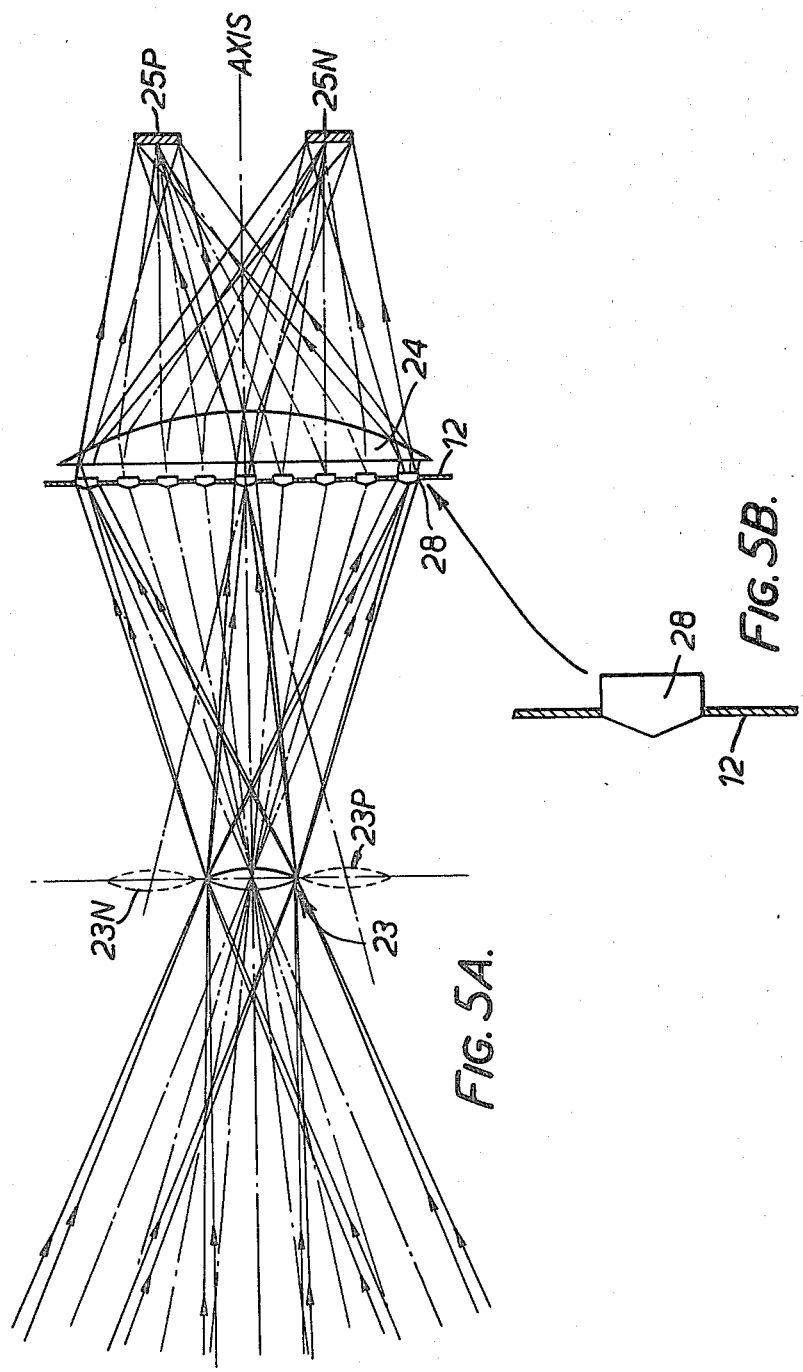
Figure 6:
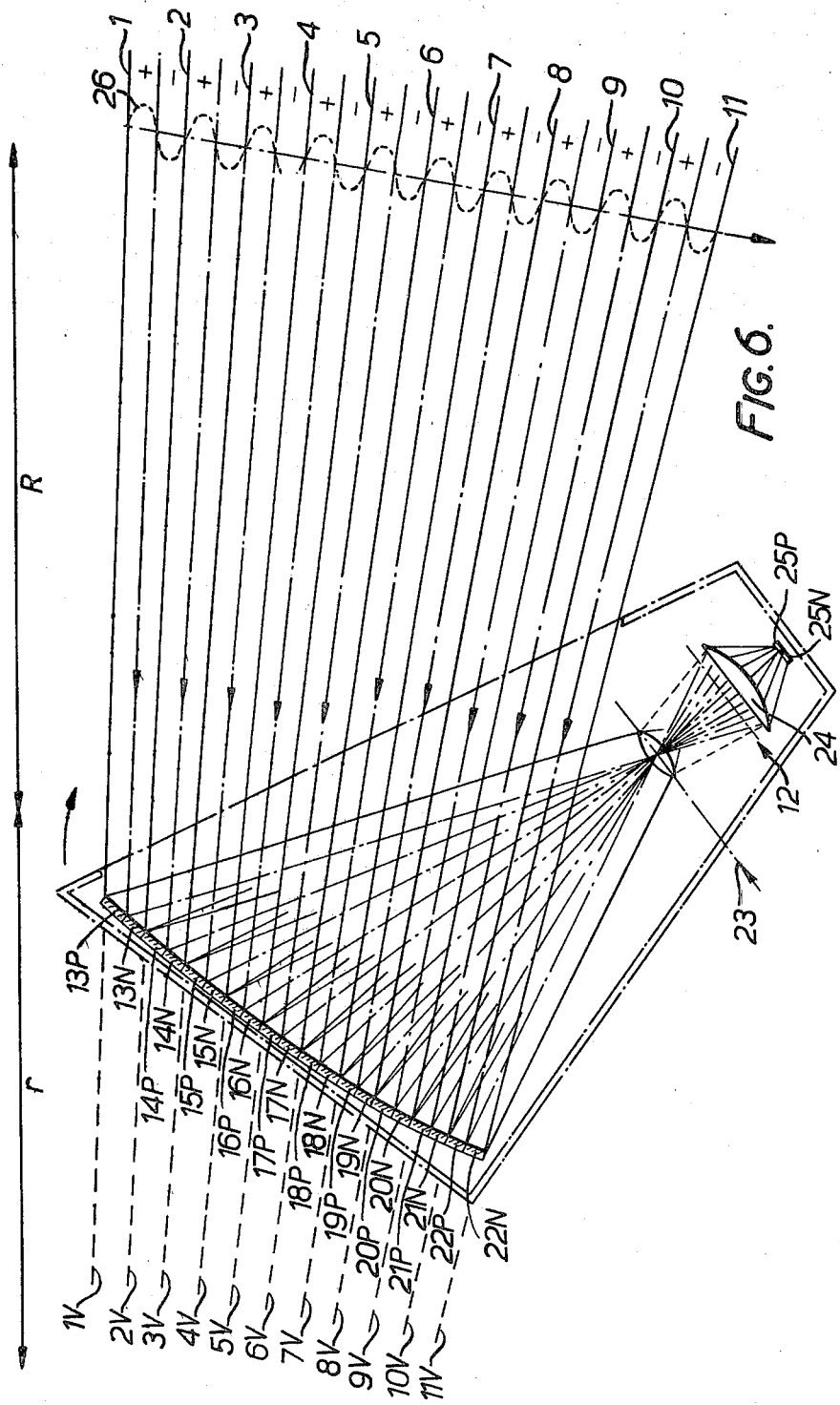
Figure 7:
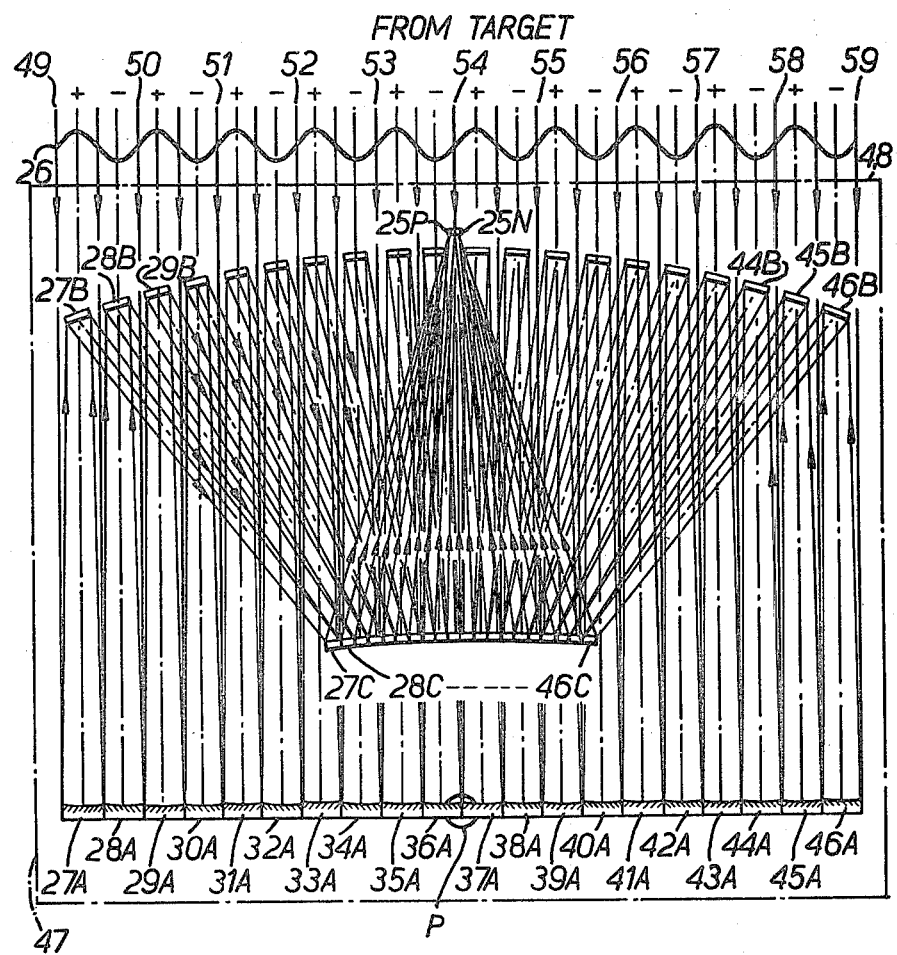
Figure 8:
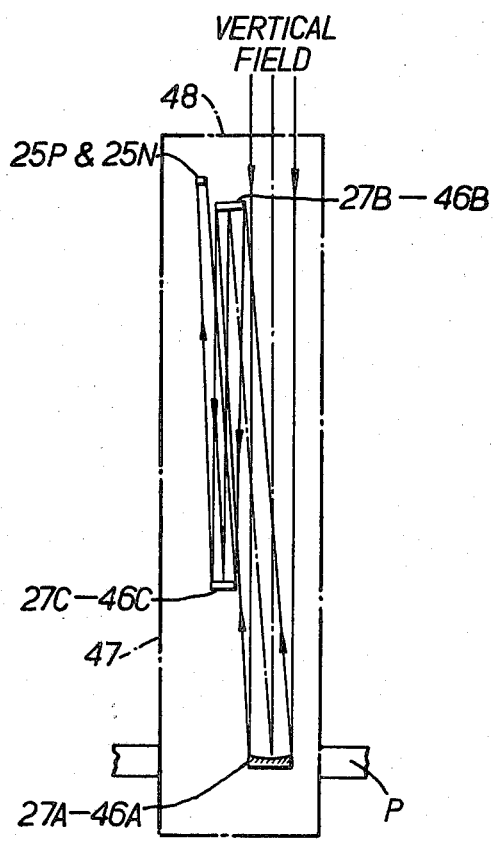

The invention is illustrated in and further described with reference to the accompanying drawings in which, FIG. 1 illustrates the basic concepts involved in an infra-red range responsive apparatus in accordance with the present invention, FIGS. 2 and 3 are explanatory graphs, FIG. 4 is a schematic diagram of one practical range responsive apparatus in accordance with the present invention, FIGS. 5a and 5b illustrate part of the arrangement of FIG. 4 in greater detail, FIG. 6 illustrates a modification to the apparatus of FIG. 4, FIGS. 7 and 8 are plan and sectional elevation views respectively of another practical range responsive apparatus in accordance with the present invention and FIG. 9 is a block schematic diagram illustrating an overall system including an apparatus as illustrated in FIGS. 7 and 8.

Referring to FIG. 1, a sensitivity pattern in azimuth represented by the lines 1 to 11 is created in space for example in a manner similar to that employed in any of our earlier applications, numbers 45065/71; 31861/71 and 39167/71, which concern optical velocity measuring equipments.

In the simplest case the sensitivity pattern may be such that an infra-red receiver at a radiation receiving point (e.g. the focal point F in the simple case of FIG. 1) receives infra-red radiation from alternate portions of the field of view (e.g. between lines 1 and 2, 3 and 4, 5 and 6, 7 and 8, 9 and 10), but not from the remaining alternate portions of the field of view, (e.g. between lines 2 and 3, 4 and 5, 6 and 7, 8 and 9, and 10 and 11). This effect may simply be achieved by the use of a suitable grating on the target side of the detector, which grating blanks out these remaining alternate portions of the field of view. It should be assumed that what may conveniently be termed the mark space ratio between the adjacent portions of field of view is unity.

From fundamental considerations the relationship between distance and time, for uniform motion, is given by $$v \times t = d$$

where v = the velocity in the direction of motion. The same information may be expressed as the inverse, namely $$1/d = 1/t \times 1/v$$

Or in words $$\text{The spatial frequency} = \frac{\text{The temporal frequency}}{\text{Velocity}} \quad (1)$$

If the sensitivity pattern of FIG. 1 is rotated about a point P situated on the axis of symmetry at a distance r from the focal point F with an angular velocity w which is constant and the range to a target T from the point P is R, then $$v = R\omega \quad (2)$$

and the fundamental spatial frequency, $f_s$, generated by the sensitivity pattern, is given by $$f_s = \frac{1}{(r + R)\alpha} \quad (3)$$

where $\alpha$ = the angle subtended at the focal point F by a line pair (that is to say the angle between two lines bounding a portion of the field of view).

By combining equations (1), (2) and (3)

$$\frac{1}{(r + R)\alpha} = \frac{f}{R\omega} \text{ i.e. } f = \frac{\omega}{\alpha} \times \left( \frac{R}{r + R} \right)$$

If we assume the spacing between the cycles of the sensitivity pattern at the optical aperture is s $$s = r\alpha \text{ and } f = \frac{\omega}{s} \times \frac{rR}{r+R} \quad (4)$$

For a collimated system, that is to say, where the lines 1 to 11 are parallel to one another, the distance r is infinite which simplifies equation 4 to become $$f = \frac{\omega}{s} R \quad (5)$$

In this case, the fundamental frequency generated by the rotating sensitivity pattern and the target contrast is directly proportional to range.

For an uncollimated system in which distance r is relatively small equation 4 approximates to $$f = \frac{\omega}{s} r \quad (6)$$

and the fundamental frequency is independent of the range of the target.

For a partial collimated system in which the lines 1 to 11 are not parallel to one another, but where the distance r is relatively great then equation 4 may be written $$f = \frac{\omega}{s\left(\frac{R+r}{r}\right)} R$$

which may be directly compared with equation 5. It will be seen that at a particular range R, the system behaviour is similar to a collimated one with spacing between cycles of $$s\left(\frac{R+r}{r}\right) \quad (7)$$

Thus for the partially collimated system the spacing between cycles increases with range. This allows a smaller overall optical aperture to be used with the spacing of the sensitivity pattern optimally matched to the size of the target at the appropriate maximum range. For example, FIG. 2 illustrates the relationship between the factors (R+r)/r and R, if the space between individual line pairs at the optical aperture is chosen as 0.1 meter. The effective aperture of the line pair for various values of r is tabulated as follows:

TABLE 1

| EFFECTIVE APERTURE OF A 0.1 METER LINE PAIR AT 5000 METER RANGE | | | | | |
|---|---|---|---|---|---|
| r meter | 125 | 250 | 500 | 1000 | ∞ |
| Effective Aperture meter | 4.1 | 2.1 | 1.1 | 0.6 | 0.1 |

The accuracy of the range measurement provided by such a partially collimated system, assuming w, s and r are constant may be assessed from equation 4 as follows: By taking logs and differentiating equation 4 it will be seen that $$\frac{df}{f} = \frac{r}{r+R} \times \frac{dR}{R} \quad (8)$$

It follows, the accuracy of range measurement relative to a collimated system decreases by the factor $$r/(r+R)$$

The factor is the inverse of the increase of spacing between the cycles.

If it is assumed that there is a fixed number of cycles in the optical aperture the fractional bandwidth df/f is constant. Thus the larger the value of 'r' the better the system is able to measure range and eliminate clutter.

The frequency response for different values of r were as shown in FIG. 3. In each case, the following parameters applied:

Horizontal aperture of system = 1 meter
Number of cycles = 10
Horizontal dimension of a single line pair at the optical aperture = 0.1 meter
Fractional Bandwidth = ±10%
Rotation Period = 10 seconds Thus for a practical design of a ground surveillance system, capable of detecting targets up to 5000 meter range, r would be chosen to be in the region 500 to 1000 meter. This would result in an effective aperture at 5000 meter of 1.1 to 0.6 meter per line pair, with proportionally less effective aperture at the shorter ranges (see FIG. 2).

It will be seen that the dimension r is an important parameter in the practical implementation of a ranging system in accordance with the present invention.

The larger the value of 'r', the closer the system approximates to a collimated system and the better the system is able to resolve range and eliminate clutter. Conversely, the smaller the value of 'r' the larger the spacing between cycles of the sensitivity pattern becomes and the smaller the overall size of the optical system.

The design is therefore a compromise in making the parameter r as large as possible. This is achieved by matching the spacing of the sensitivity pattern to the size of the target at the appropriate maximum range.

The practical arrangement now to be described with reference to FIGS. 4, 5a and 5b is one which enables a relatively large value of r to be achieved without involving the large overall size which would be involved if the simple configuration of FIG. 1 were employed.

In FIGS. 4, 5a and 5b, like references are used for like parts in FIG. 1.

Unlike the arrangement of FIG. 1, the portions into which the field of view is divided contains no portions which correspond to the solid portions of the grating 12 between slits. This effect is achieved by suitably inclining each of the reflective elements 13 to 22 so as to close up the images of the slits in the grating 12.

Energy received from each individual part in the field of view through the different slits in the grating 12 is focused by an energy collection lens 24 onto an infrared detector arrangement consisting of two individual detectors 25N and 25P. Detector 25N is arranged to receive energy through one half of each slit in the grating 12 whilst detector 25P is arranged to receive energy through the other half of each slit in the grating 12. The optical arrangement of detectors 25N and 25P, lenses 23 and 24 and grating 12 will be described in greater detail with reference to FIGS. 5a and 5b. The effect however is illustrated in FIG. 4. Each part of the field of view (e.g. between line pair 1 and 2) consisting of an imaged slit in the grating 12, is itself divided into two portions, one portion viewed ultimately by detector 25N and the other portion viewed ultimately by detector 25P. If the electrical outputs of the two detectors are combined in anti-phase, i.e. if the output of detector 25N is inverted and added to the output of detector 25P, a sensitivity pattern as shown at 26 is created. As will be seen, across each part of the field of view seen through one slit the sensitivity pattern changes through a complete cycle, a negative half cycle over the portion viewed by detector 25N and a positive half cycle over the portion viewed by detector 25P.

As has already been mentioned the sensitivity pattern consists of ten parts of the field of view between lines 1 and 2, 2 and 3, 3 and 4 . . . and so on, each consisting of a portion of negative sensitivity viewed ultimately by detector 25N and a portion of positive sensitivity viewed ultimately by detector 25P. The ten different parts of the field of view are formed by imaging into space the slits in the ten slit grating 12 via the ten individual infra-red reflective elements 13 and 22. Interposed between the grating 12 and the reflective elements 13 to 22 is an imaging lens 23.

The detector 26, lens 23 and 25, grating 12 and the individual reflective elements 13 to 22 are enclosed within a casing 27 which is mounted so as to be rotatable in azimuth about the point P.

The slits in the grating 12 are relatively narrow in azimuth i.e. the plane of rotation, (that is to say in the plane of the drawing) but relatively long in elevation, i.e. at right angles to the plane of rotation in order to gather as much energy as possible.

The optical system is, in fact, of the partially collimated type as has already been discussed in principle earlier in this specification. The lines 1 to 11 bounding the different parts of the field of view are divergent in the direction of the target T and if extended beyond the reflective elements 13 to 22 (as represented by the dashed lines 1V to 11V) would come to a focus at a distant virtual focal point (not shown). It will, it is believed, now be appreciated that with an arrangement as shown in FIG. 4, the distance r from the point of rotation P to the focal point corresponding to F in FIG. 1 may be great without the overall size of the optical head contained within the housing 27 being unduly large. This is an important consideration not only since the optical head is rotated about the point P, but also the smaller the head is, the less likelihood there is of this being noticed at the target.

Referring more particularly to FIGS. 5a and 5b, the grating 12 lies in the conjugate image plane of the objective lens 23. In order to divide energy received by each slit into two equal portions, one to be received by detector 25N and the other by detector 25P, a symmetrical prismatic refractive element 28 (shown to larger scale in FIG. 5b) is provided in each slit.

Energy from one half of the spatial information cycle is imaged onto one facet of each prismatic element, whilst energy from the other half of the spatial information cycle is imaged onto the other facet of each prismatic element.

In each case the energy on the one facet (e.g. the one shown uppermost as drawn) is refracted in one general direction (i.e. downwards as drawn) whilst the energy on the other facet is refracted in another general direction (i.e. upwards as drawn). In the complete assembly the condenser lens system 24 concentrates this refracted energy in two areas at which the photodetectors 25N and 25P are placed as though the energy were derived from two effective lenses 23N and 23P respectively displaced either side of the objective lens 23, as represented in dotted outline. Thus all energy from even numbered, positive, half cycles of the sensitivity pattern reach one photodetector (i.e. 25P) and all that from odd numbered, negative, the other (i.e. 25N) thus allowing the signals to be balanced by combining the outputs of the two detectors in antiphase. This enhances the required signal and tends to cause cancellation of spurious signals.

Referring to FIG. 6, in which like references are used for like parts in FIG. 4 as will be seen the only difference between the arrangement illustrated in FIG. 6 and that described with reference to the aforementioned FIG. 4 and FIGS. 5a and 5b is that each individual infra-red reflective element 13 to 22 of FIG. 4 is replaced by two individual infra-red reflective elements. The two individual infra-red reflective elements replacing element 13 of FIG. 4 are referenced 13P and 13N, the two elements replacing element 14 of FIG. 4 are referenced 14P and 14N . . . and so on. The elements 13P, 14P, 15P, 16P, 17P, 18P, 19P, 20P, 21P and 22P are arranged to direct light from the portions of the field of view containing positive half cycles of the sensitivity pattern on to the detector 25P, whilst similarly the elements 13N, 14N, 15N, 16N, 17N, 18N, 19N, 20N, 21N and 22N are arranged to direct light from the portions of the field of view containing negative half cycles of the sensitivity pattern on to the detector 25N.

The operation of the arrangement is similar to that of the embodiment illustrated in FIG. 4. It will be found, however, that the tendency for confusion to result at short ranges between light from adjacent portions of the field of view, due to the common imaging area of the embodiment of FIG. 4, is reduced.

Referring to FIGS. 7 and 8, in this case the optical system is such that it uses only reflective elements and does not involve the use of a grating. FIG. 7 is a plan view in the plane of rotation about P, whilst FIG. 8 is a sectional elevation.

The sensitivity pattern is created by twenty spherical focusing infra-red reflective elements referenced 27A to 46A. These reflective elements are mounted at an upper level across the rear of a housing 47 which has a front surface 48 which is either open, or closed by a sheet of infra-red transmissive material.

As with the arrangements of FIGS. 4 and 6, the field of view is divided into ten parts, each consisting of two equal portions between lines 49 and 50, 50 and 51, 51 and 52 . . . and so on. Each adjacent pair of portions embraces one complete cycle of the sensitivity pattern again represented at 26. As with the arrangement of FIG. 6, for each portion of the field of view a different reflective element 27A to 46A is provided. The odd numbered of the reflective elements 27A to 46A receive energy from portions of the field of view embracing positive half cycles of the sensitivity pattern, whilst the even numbered of the reflective elements 27A to 46A receive energy from portions of the field of view embracing negative half cycles of the sensitivity pattern. The cyclic nature of the sensitivity pattern again results from the fact that, as will be seen later, two infra-red detectors are provided whose outputs are combined in anti-phase. These two infra-red detectors are referenced 25N and 25P since they are essentially similar to the similarly referenced detectors in the arrangements of FIGS. 4 and 6.

In the horizontal plane the axis of the reflective elements 27A to 46A are arranged to lie along the centre lines of the portions of the sensitivity pattern (positive or negative portions, as the case may be), which sensitivity pattern may be collimated or part collimated as has already been discussed. In the vertical plane, the reflective elements 27A to 46A are tilted downwards (as best seen from FIG. 8) each directing received energy on to a different one of a first array of twenty planar mirrors referenced 27B to 46B which are arranged at a lower level towards the front of the housing 47. Each planar reflective element 27B to 46B is arranged in turn to reflect received energy on to a different one of twenty further planar reflectors referenced 27C to 46C, which are arranged in a still lower level towards the rear of the housing 47.

The second series of planar reflectors 27C to 46C are finally arranged to reflect received energy on to one or other of the aforementioned two infra-red detectors 25N and 25P which are mounted towards the front of the housing and at a level lower than that of said second series of planar reflectors.

As shown the array of planar reflectors 27B to 46B are tilted in the horizontal plane in order to "close up" the optical system as well as being tilted in the vertical in order to reflect energy downwards towards the reflective elements 27C to 46C in the lower level.

As will be seen energy received by the odd numbered of the planar reflectors 27C to 46C are directed on to detector 25P, whilst the even numbered of the plane reflectors 27C to 46C direct received energy on to the detector 25N. Thus detector 25P receives energy from the odd numbered of the focusing reflective elements 27A to 46A and hence from portions of the field of view embracing positive half cycles of the sensitivity pattern, whilst detector 25N receives energy from the even numbered of the focusing reflective elements 27A to 46A and hence from the portions of the field of view embracing negative half cycles of the sensitivity pattern. The output of the detector 25N, as has already been mentioned, is reversed in polarity before combining with the output from the detector 25N prior to the combined signal being subjected to frequency detection as has already been described. This is in order to achieve a balancing effect tending to reduce the sensitivity of the system to noise.

The total path lengths between the reflectors 27A to 46A and the detectors 25P and 25N, together with the focal length of the focusing reflective elements 27A to 46A are chosen to image the detectors at a design range, selected as required, and with a magnification which images a detector to fill one half cycle (i.e. one half of the distance between lines 49 and 50, 50 and 51 . . . and so on) at that particular range.

The advantages of the system shown in FIGS. 7 and 8 compared, for example, with the system shown in FIG. 4 or FIG. 6, is that it allows imaging to be carried out on axis in the important horizontal plane (assuming the horizontal plane to be the plane of rotation) in order to reduce aberration. The system shown is diffraction limited horizontally. The fact that the focusing elements 27A to 46A are tilted vertically is not of practical consequences, since in the vertical plane the slight aberration which may thus be incurred is tolerable. In addition, the use of reflective elements only, avoids any chromatic effects. It will also be noted that the construction permits the degree of collimation to be adjusted by suitably adjusting each of the focusing reflective elements 27A to 46A.

Referring to FIG. 9, the system illustrated thereby consists of a scanning head 60 which is as illustrated in FIGS. 7 and 8. Two infra-red detectors are schematically represented at 25N and 25P. Output from infra-red detector 26N is connected to an inverter 61. Output from inverter 61 is combined with output from the other infra-red detector 26P.

The combined output is applied to the inputs of a number (in this case four) of bandpass filters 62, 63, 64 and 65. Each bandpass filter has a pass band, which may be very narrow or comparatively wide as required, corresponding to a range window of interest. The output of each bandpass filter 62 to 65 is connected to the input of a frequency detector referenced respectively 66, 67, 68 and 69. Each frequency detector 66 to 69 provides an output signal if it detects any frequency passed by its respective bandpass filter. The outputs of the frequency detectors 66 to 69 are connected to the inputs of four indicators referenced respectively 70, 71, 72 and 73. Each of the indicators 70 to 73 are such as to provide a required form of indication that a target has been detected at a range within the range window provided by the respective bandpass filter. In its simplest form, each indicator may be such as merely to alert an operator.

As shown the output from each of the bandpass filters 62 to 65 is also applied to a frequency measuring range indicator 74 whereby an indication of the range of a target is also provided. The frequency measuring range indicator comprises, in essence, at least one combination of frequency-to-d.c. converter and meter. One combination may be provided for each range window or for a number or all of the range windows by suitable combination of the outputs of the filters 62 to 65 applied to the indicator 74. Electrically, the indicator is similar to that used to indicate velocity from a Doppler frequency input in a radar system.

We claim:

1. A range responsive apparatus comprising energy sensitive means arranged to receive electro-magnetic energy from a target simultaneously from different spaced portions of a field of view and being capable of producing an electrical output, and means for rotating said field of view about an axis of rotation to cause said field of view to sweep across a target, lines bounding the different portions of the field converging toward a point located remote from said target, and said axis of rotation being between said target and said point whereby, in operation, the electrical output of said energy sensitive means includes a frequency component which is dependent upon the range of said target.

2. An apparatus as claimed in claim 1 and wherein the energy sensitive means comprises a plurality of individual energy sensitive devices each of which is arranged to receive energy from a different one of said spaced portions of said field of view and the outputs of which are arranged to be combined.

3. An apparatus as claimed in claim 1 and wherein said energy sensitive means comprises one energy sensitive detector arranged to receive energy from all of said spaced portions of said field of view.

4. An apparatus as claimed in claim 1 and wherein said energy sensitive means is infra-red energy sensitive means.

5. An apparatus as claimed in claim 1 and wherein an array of focusing electro-magnetic energy reflective elements are provided each arranged to image into space a common electro-magnetic energy detector, each focusing reflective element viewing a different spaced portion of the field of view.

6. An apparatus as claimed in claim 5 and wherein a second electro-magnetic energy detector is provided which is arranged to be imaged into space by a second array of focusing electro-magnetic energy reflective elements, the focusing reflective elements of said second array being interspersed in alternating fashion between the focusing reflective elements of said first array and arranged to view different spaced portions of the field of view which are interspersed in alternating fashion with the portions of the field of view viewed by the focusing reflective elements of said first array.

7. An apparatus as claimed in claim 5 and wherein the portions of the field of view viewed by all of the reflective elements in both arrays are of equal length in the plane of rotation and means are provided for combining the outputs of said two detectors in anti-phase prior to being applied for connection to frequency measuring means.

8. An apparatus as claimed in claim 5 and wherein each focusing reflective element is a spherical reflective element.

9. An apparatus as claimed in claim 5 and wherein said focusing elemental reflective elements are arranged to direct light received from the portions of the field of view on to the electro-magnetic energy detector via an array of plane reflectors said focusing reflective elements being arranged to lie in a plane spaced from the plane in which the array of planar reflective elements lie, but with said two last mentioned planes parallel to the plane of rotation, and said focusing and planar reflective elements being tilted from the perpendicular to the plane of rotation as required to provide the energy paths from the focusing reflective elements to the electro-magnetic energy detector, as required.

10. An apparatus as claimed in claim 9 and wherein a second array of planar reflective elements is interposed between said first mentioned array of planar reflective elements and the detector, said second array of planar reflective elements lying in a plane spaced from but parallel to the said plane in which the first mentioned array of planar reflective elements lie and on the side thereof remote from the said plane in which the focusing reflective elements lie, the planar reflective elements of said second array being tilted from the perpendicular to the plane of rotation as required.

11. An apparatus as claimed in claim 10 and wherein the detector lie in the same plane as the second array of planar reflective elements.

12. An apparatus as claimed in claim 10 and wherein the detector lie in a further plane spaced from but parallel to the plane in which said second array of planar reflective elements lie and on the side thereof remote from the plane in which the first array of planar reflective elements lie.

13. An apparatus as claimed in claim 12 and wherein the plane of rotation is the horizontal plane, said array of focusing reflective elements is arranged at one level across the rear of a housing to direct received energy in the target direction towards the front of said housing onto said first array of planar reflective elements which are arranged at a lower level towards the front of said housing, said first array of planar reflective elements is arranged to direct energy towards the rear of said housing onto said second array of planar reflective elements which is arranged at a still lower level and said second array of planar reflective elements is arranged to direct energy towards said detector or detectors mounted towards the front of the housing at a level below that of said second array of planar reflective elements.

14. An apparatus as claimed in claim 5 and wherein the axis of rotation is arranged to pass approximately through the middle of said array of focusing reflective elements.

15. An apparatus as claimed in claim 1 and wherein frequency responsive means for indicating the range of a target are provided to receive output from said energy sensitive means.

16. An apparatus as claimed in claim 1 and wherein one or more frequency band selective filters are connected to the output of said energy sensitive means to provide one or more range windows so that selected ranges are excluded.

17. An apparatus as claimed in claim 16 and wherein the output of at least said one filter is applied to a frequency responsive means which generates a signal indicating the presence of a target at a range of interest within the range window or windows.

18. A range responsive apparatus comprising energy sensitive means arranged to receive electro-magnetic energy from a target simultaneously from different portions of a field of view and being capable of producing an electrical output, and means for rotating said field of view about an axis of rotation to cause said field of view to sweep across a target and wherein lines bounding the different portions of the field of view are arranged to be divergent in the direction of the target with said lines converging at a point nearer than infinity, and said axis of rotation being between said target and said point, whereby, in operation, the electrical output of said energy sensitive means includes a frequency component which is dependent upon the range of said target.

19. An apparatus as claimed in claim 18 and wherein a series of individual reflective elements, one for each portion of the field of view, is interposed between said focal point and the axis of rotation, a grating defining a plurality of slits, each elemental reflective element being arranged to direct electro-magnetic energy via a different slit in said grating on to a common detector.

20. An apparatus as claimed in claim 19 and wherein the slits are narrow in the plane of rotation and relatively long in a plane at right angles thereto in order to provide good energy gathering properties.

21. An apparatus as claimed in claim 19 and wherein said elemental reflective elements are inclined so that the field of view is divided into a series of adjacent parts each an image of a different slit and means are provided for optically dividing each slit, and hence each of said adjacent parts of the field of view, into two portions along its extension in a direction at right angles to the plane of rotation, energy received by one portion of each slit being directed on to one detector, whilst energy received on the other portion of each slit is directed on to another detector, the outputs of which are arranged to be combined in anti-phase prior to being applied for connection to frequency measuring means.

22. A modification of the apparatus claimed in claim 21, in which a series of individual reflective elements are provided, one for each portion of the field of view, the individual reflective element for one portion of the field of view being arranged to direct light into one portion of one slit in the grating, whilst an adjacent individual reflective element is arranged to direct light received from the adjacent portion of the field of view through the other portion of the same slit.

* * * * *